United States Patent [19]

Batchelor

[11] Patent Number: 4,644,822
[45] Date of Patent: Feb. 24, 1987

[54] TRANSFER CASE FOR VEHICLE DRIVETRAINS

[75] Inventor: Robert B. Batchelor, Birmingham, Mich.

[73] Assignee: American Motors Corporation, Southfield, Mich.

[21] Appl. No.: 700,175

[22] Filed: Feb. 11, 1985

[51] Int. Cl.$^4$ ............................................. F16H 37/08
[52] U.S. Cl. ....................................... 74/695; 74/700; 74/710.5; 180/250
[58] Field of Search .............. 180/247, 248, 249, 250; 74/674, 682, 695, 705, 714, 710.5, 700

[56] References Cited

U.S. PATENT DOCUMENTS

| | | | |
|---|---|---|---|
| 3,323,389 | 6/1967 | Hause | 74/714 |
| 3,656,573 | 4/1972 | Halberg | 180/249 |
| 4,103,753 | 8/1978 | Holdeman | 180/250 |
| 4,138,906 | 2/1979 | Nakao et al. | 74/674 |
| 4,369,671 | 1/1983 | Matsumoto et al. | 180/274 |
| 4,417,642 | 11/1983 | Suzuki et al. | 74/682 |
| 4,538,700 | 9/1985 | Suzuki | 180/250 |

FOREIGN PATENT DOCUMENTS 0083617  6/1980  Japan .................. 180/274

*Primary Examiner*—Leslie Braun
*Assistant Examiner*—Mart Belisario
*Attorney, Agent, or Firm*—Brooks & Kushman

[57] ABSTRACT

A vehicle transfer case (10) includes first and second planetary gear sets (68,70) and a selector (146) for selectively positioning (a) the first planetary gear set (68) in an operating position and the second planetary gear set (70) in a locked position to provide low speed driving without any differential action between first and second outputs (36,38) or (b) the first planetary gear set (68) in a locked or nonoperating position and the second planetary gear set (70) in an operating position to provide high speed driving with differential action between the first and second outputs (36,38). The second planetary gear set (70) which selectively provides the differential action between the first and second outputs (36,38) has components (106,108,122) all of which are rotatable about a central axis A, and planet gears (126,128) of the planet carrier component (122) are rotatable about axes parallel to the central axis. This construction provides compact axial packaging of the transfer case while still having a differential action between the two outputs (36,38). Both planetary gear sets (68,70) are positioned along a central shaft (40) having one end constituting the first output (36) and are located between an input (28) and an output member (71) connected to the second output (38), to thereby provide compact packaging.

9 Claims, 3 Drawing Figures

TRANSFER CASE FOR VEHICLE DRIVETRAINS

TECHNICAL FIELD

This invention relates to a transfer case for vehicle drivetrains to selectively provide either two or four wheel driving as required.

BACKGROUND ART

Many prior vehicle drivetrain transfer cases incorporate a planetary gear set for providing either two or four wheel driving of an associated vehicle. See, for example, U.S. Pat. No. 4,070,591 which discloses this type of transfer case.

In the four wheel mode of operation where both the front and rear axles are driven through the transfer case, it is also conventional to either interlock the two axles for constant speed driving without any slippage with respect to each other or to provide a differential action between the the two axles in order to permit torque splitting and different speeds between the two axles which is necessary in certain driving conditions to prevent torque buildup in the drivetrain. Usually the differential action is provided by interconnecting front and rear axle outputs of the drivetrain through a differential of the type including beveled side gears and beveled pinion gears meshed with each other. Such beveled gear differentials are conventionally located adjacent the rear wheel output at a location on the opposite side of a front wheel output gear or sprocket from the transfer case input. As disclosed by U.S. Pat. No. 4,299,140, transfer case differentials so located adjacent one of the outputs have also previously utilized a planetary gear set including an outer annular gear, a carrier rotatable concentric with the outer annular gear and having pinions rotatably supported thereon about associated axes parallel with the central axis of the outer annular gear, and a sun gear also rotatable about the same axis as the outer annular gear. This type of planetary gear set provides interaxle differential action with a much more compact configuration than the beveled gear type of differential. However, the positioning of this type of differential adjacent one of the outputs in a conventional manner results in a more space consuming construction than is desirable.

Other transfer cases and vehicle drivetrain power transmission units and the like are disclosed by U.S. Pat. Nos. 3,378,093; 3,407,893; 3,492,890; 3,760.922; 4,215,593; and 4,344,335.

DISCLOSURE OF INVENTION

An object of the present invention is to provide an improved vehicle transfer case including first and second planetary gear sets of a compact construction and also including a selector that operates the gear sets to provide either: (1) low speed driving of first and second outputs in a locked relationship with respect to each other so as to provide four wheel driving without any interaxle differential action; or (2) high speed driving of the first and second outputs with a differential action therebetween so as to provide four wheel driving with interaxle differential action.

In carrying out the above object, the invention is embodied by a vehicle transfer case including an input adapted to be rotatively driven about a central axis by an engine and also including first and second outputs for respectively rotatively driving first and second pairs of wheels. The improved construction of the transfer case includes a first planetary gear set rotatively driven by the input and a second planetary gear set rotatively driven by the first planetary gear set.

The first planetary gear set of the transfer case has an operating position where planetary operation thereof about the central axis by driving rotation of the input provides driving of the second planetary gear set with speed reduction. This first planetary gear set also has a locked or nonoperating position where driving of the second planetary gear set by the input is provided without any speed reduction resulting from planetary operation of the first planetary gear set.

The second planetary gear set includes a pair of components embodied by first and second gears supported for rotation about the central axis and also includes another component embodied by a planet carrier rotatable about the central axis. Two of these components are respectively connected to the first and second outputs and the other component is rotatively driven by the first planetary gear set. The planet carrier of the second planetary gear set has first and second sets of planet gears supported thereby for rotation about associated planet axes that extend parallel to the central axis. These first and second sets of planet gears are respectively meshed with the first and second gears and are also meshed with each other to connect the first and second outputs. The second planetary gear set has an operating position where planetary operation thereof about the central axis provides a differential action between the first and second outputs so as to provide interaxle differential action. The second planetary gear set also has a locked position where planetary operation thereof is locked out to connect both outputs without any differential action so that there is no interaxle differential action.

A selector of the transfer case embodying the invention selectively and alternately positions (a) the first planetary gear set in its operating position and the second planetary gear set in its locked position to provide low speed driving without any differential action between the first and second outputs and the associated axles driven thereby, or (b) the first planetary gear set in its locked or nonoperating position and the second planetary gear set in its operating position to provide high speed driving with differential action between the first and second outputs such that interaxle differential action is provided.

In the preferred construction disclosed, the first planetary gear set includes an annular outer gear extending about the central axis adjacent the input. A planet carrier of the first planetary gear set is rotatable about the central axis and includes planet gears supported thereby within the outer gear in a meshed relationship with the outer gear. The first planetary gear set also preferably includes a sun gear rotatable about the central axis within the outer gear thereof and meshed with the planet gears to provide the planetary operation.

The second planetary gear set is disclosed as having its first gear embodied by an annular outer gear that extends about the central axis with one of the sets of planet gears thereof meshed with this outer gear. The second gear of the second planetary gear set is disclosed as being embodied by a sun gear that is rotatable about the central axis within the outer gear thereof and meshed with the other set of planet gears of the second planetary gear set. As disclosed, the first outer gear of the second planetary gear set is rotatively driven by the first planetary gear set during the operation of the transfer case, and the planet carrier and sun gear thereof are respectively connected to the first and second outputs.

A central shaft of the transfer case extends along the central axis thereof through both the first and second planetary gear sets. This central shaft has one end that is located adjacent the input of the transfer case and another end that constitutes the first output of the transfer case. An output member embodied by a chain sprocket is rotatably mounted on the central shaft between the ends thereof and is connected to the second output of the transfer case. The first and second planetary gear sets are located between the input and this output member to provide a compact construction which is permitted by the manner in which both planetary gear sets have all of the axes thereof extending parallel to or along the central axis unlike conventional transfer cases.

In the preferred construction disclosed, the first planetary gear set of the transfer case includes a sun gear rotatively driven by the input and also includes an annular outer gear and a planet carrier having planet gears meshed with both the sun gear and the annular outer gear. This outer gear is rotatable with respect to its associated planet carrier and is movable therewith along the central axis. A stationary grounding plate of the first planetary gear set is engaged by the outer gear upon axial movement thereof with its associated planet carrier along the central axis to prevent rotation of the outer gear in the operating position of the first planetary gear set. The sun gear is engaged with the planet carrier and with the planet gears of the first planetary gear set and the outer gear thereof is disengaged from the stationary grounding plate upon axial movement of the outer gear and the associated planet carrier to the locked or nonoperating position where the sun gear drives the planet carrier of the first planetary gear set.

The disclosed construction of the second planetary gear set includes an annular outer gear that constitutes the component thereof rotatively driven by the first planetary gear set and has a connection to the planet carrier of the first planetary gear set so as to be axially movable therewith along the central axis. The planet carrier of the second planetary gear set constitutes the component thereof connected to the first output and the sun gear thereof constitutes the component thereof connected to the second output. Engagement of the sun gear of the second planetary gear set with both the planet carrier and planet gears thereof in the locked position prevents any differential action between the first and second outputs. Disengagement of the sun gear of the second planetary gear set from the planet carrier thereof by axial movement to the operating position provides the differential action between the first and second outputs.

In the disclosed embodiment of the transfer case, the first and second planetary gear sets include an intermediate connector. The selector of the transfer case includes a shifter that is received by a shifter groove of the connector to provide axial shifting of the planetary gear sets between the operating position and the locked or nonoperating position to which the planetary gear sets are selectively and alternately moved.

The objects, features, and advantatges of the present invention are readily apparent from the following detailed description of the best mode for carrying out the invention when taken in connection with the accompanying drawings.

BEST MODE FOR CARRYING OUT THE INVENTION

Figure 1:
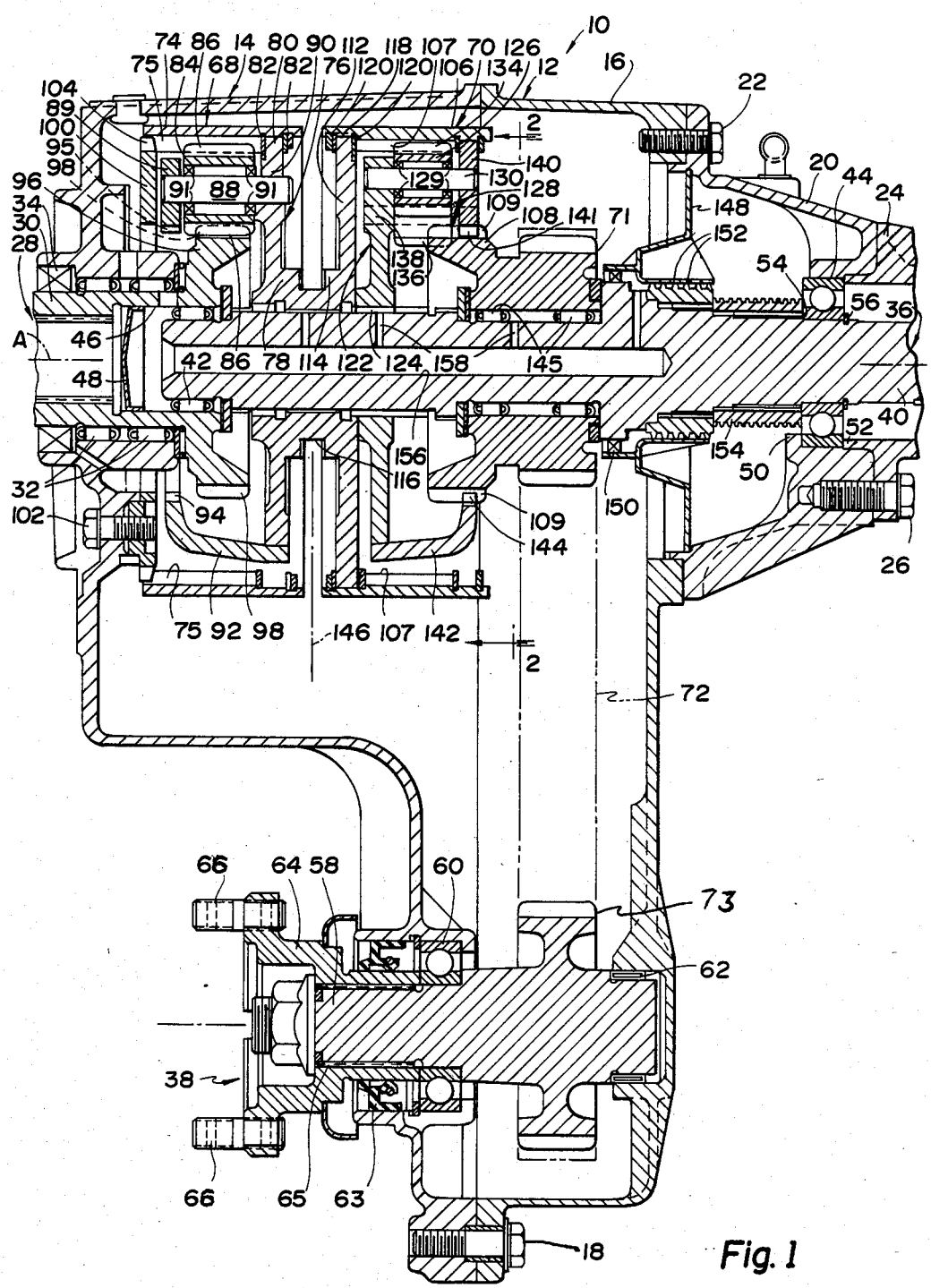
FIG. 1 is a longitudinal sectional view taken through a transfer case constructed in accordance with the present invention and illustrated with first and secondary planetary gear sets of the transfer case respectively positioned in operating and locked positions.

With reference to FIG. 1 of the drawings, a vehicle transfer case constructed in accordance with the present invention is generally indicated by 10 and includes a housing 12 having front and rear cast metal housing members 14 and 16 that are secured to each other by a set of bolts 18 only one of which is shown. A cast metal rear extension 20 of the housing 12 is secured to the rear housing member 16 by a set of bolts 22 only one of which is shown. A rear end connector 24 of housing 12 is secured to the rear extension 20 by a set of bolts 26 (only one of which is shown) to complete the assembly of the transfer case whose construction is hereinafter more fully described.

Transfer case 10 illustrated in FIG. 1 includes an input 28 embodied by an input shaft 30 that is rotatively supported on the front housing member 14 by a pair of bearings 32 for rotation about a central axis A. Input shaft 30 is adapted to be rotatively driven by an associated vehicle engine through an intermediate transmission and is sealed with the housing by a schematically indicated seal 34.

In addition to the input 28, the transfer case 10 illustrated in FIG. 1 also includes first and second outputs 36 and 38 for respectively rotatively driving first and second pairs of wheels. The first input 36 is embodied by a central shaft 40 that extends along axis A and is adapted to be connected to a prop shaft for driving the rear axle which drives the rear pair of wheels. Shaft 40 is supported for rotation about axis A by front and rear bearings 42 and 44. The front bearing 42 is located within a rearwardly facing bore 46 of the input shaft 30. This input shaft bore 46 is closed by a cap seal 48 to maintain lubrication within the transfer case. The rear bearing 44 is of the antifriction type and has its outer race axially positioned between a flange 50 of the rear housing extension 20 and a flange 52 of the end connector 24, while the inner race of bearing 44 is positioned between an axial shoulder 54 of the shaft 40 and a retaining clip 56 on the shaft. In a spaced relationship from the central axis A about which the shaft 40 is rotatively supported by the bearings 42 and 44, the second output 38 includes an output shaft 58 for driving the front axle to drive the front pair of wheels. An antifriction bearing 60 rotatively supports the shaft 58 on the front housing member 14 in a suitable manner, while a rear bearing 62 rotatively supports the shaft 58 on the rear housing member 16. Adjacent the antifriction bearing 60, an annular seal 63 is sealed with a front connection extension 64 secured by a spline connection 65 to the shaft 58.

This extension 64 extends forwardly out of the transfer case housing and has suitable connector studs 66 utilized to provide connection thereof to the front axle to provide driving of the front pair of wheels.

Transfer case 10 illustrated in FIG. 1 includes a first planetary gear set 68 that is rotatively driven by the input 28 and also includes a second planetary gear set 70 that is rotatively driven by the first planetary gear set. As is hereinafter more fully described, the transfer case is operable through the planetary gear sets 68 and 70 to selectively and alternately provide either low speed driving of both outputs 36 and 38 without any differential action therebetween or high speed driving of both outputs 36 and 38 with a differential action that accommodates for differential interaxle speeds. During both modes of operation, the second planetary gear set 70 drives both the first and second outputs 36 and 38. Driving of the first output 36 is through the central shaft 40 in a manner which is hereinafter more fully described. Driving of the second output 38 is through an output member embodied by a chain sprocket 71 which is meshed with a schematically illustrated chain 72 that is also meshed with a another output member embodied by a chain sprocket 73 on the output shaft 58 of second output 38.

The first planetary gear set 68 is disclosed as including an annular outer gear 74 extending about the central axis A and having inwardly projecting teeth 75 that extend parallel to the central axis A. A planet carrier 76 of the first planetary gear set 68 has an inner portion 78 rotatably supported on the central shaft 40 and has an outer portion 80 on which the outer gear 74 is supported for rotation with respect thereto about axis A while being limited to prevent relative axial movement by slide rings 82. Planet carrier 76 includes a set of planet gears 84 (three in the transfer case illustrated) whose teeth 86 are meshed with the teeth 75 of the outer gear 74. Shafts 88 of the planet carrier 76 extend between spaced front and rear portions 89 and 90 of the planet carrier with the planet gears 84 therebetween supported on the associated shafts by schematically indicated bearings 91. At circumferentially spaced locations between the planet gears 84, the planet carrier 76 includes support portions 92 that extend from the outer periphery of the rear portion 90 toward the front and then inwardly where teeth 94 are provided to provide a support function hereinafter described. Teeth 95 are provided on the front portion 89 of the planet carrier 76 and function to provide locking and unlocking of the first planetary gear set. A sun gear 96 of the first planetary gear set is formed unitary with the input shaft 30 so as to be rotatable about axis A and has teeth 98 meshed with the teeth 86 of the planet gears 84. A stationary grounding plate 100 is mounted by bolt mounts 102 just forward of the first planetary gear set 68 and has teeth 104 that are engaged and disengaged by the teeth 75 of the outer gear 74 as described below.

In FIG. 1, the first planetary gear set 68 is in an operating position with the annular outer gear 74 stationary as a result of engagement of its teeth 75 with the teeth 104 of the grounding plate 100. As such, rotation of the input 28 rotates the shaft 30 to rotate the sun gear 96. Such rotation of the sun gear 96 meshed with the planet gears 84 that are also meshed with the stationary outer gear 74 provides a planetary action that rotates the planet carrier 76 to provide speed reduction in the driving of the second planetary gear set 70 as is hereinafter more fully described.

Figure 3:
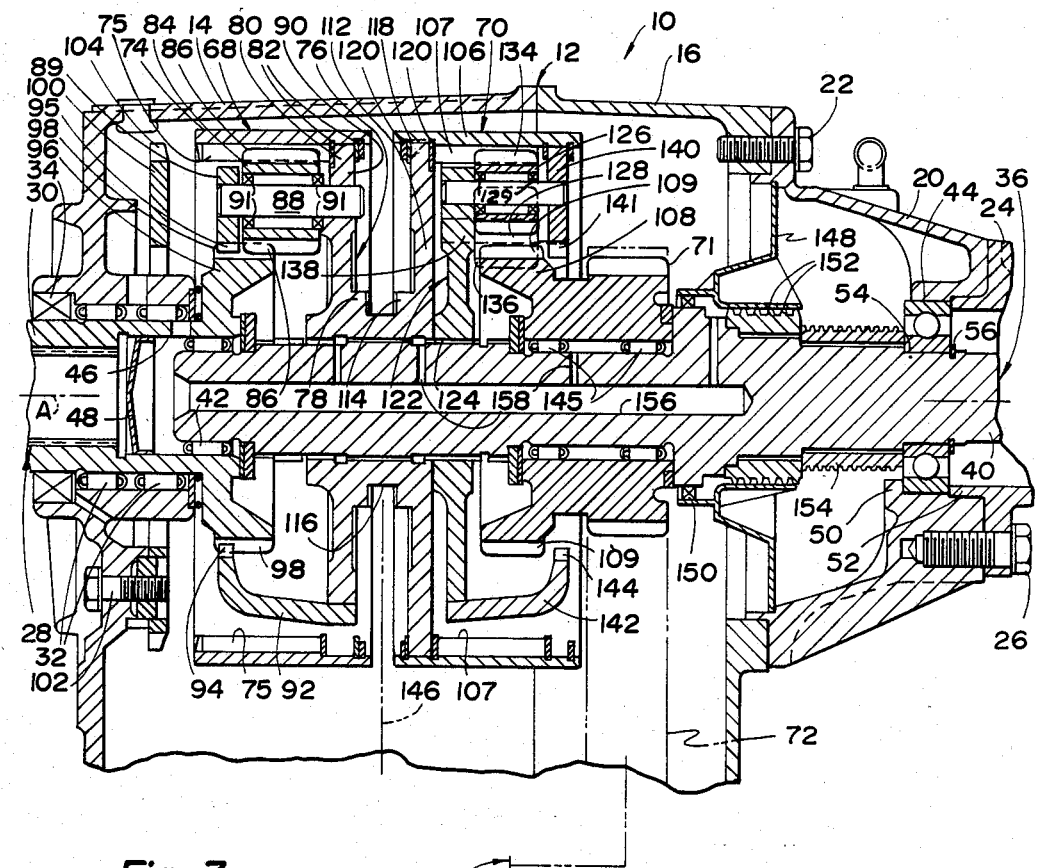
FIG. 3 is a partial sectional view of the transfer case taken in the same direction as FIG. 1 but with the first and second planetary gear sets respectively illustrated in a locked or nonoperating position and in an operating position.

Shifting of the first planetary gear set 68 from the operating position of FIG. 1 to a locked or nonoperating position shown in FIG. 3 provides driving of the first planetary gear set by the input 28 without any speed reduction. This shifting is provided by axially shifting the planet carrier 76 toward the right to disengage the teeth 75 of the annular outer gear 74 from the teeth 104 of the grounding plate 100 and to also engage the teeth 98 of the sun gear 96 with the teeth 95 on the front portion 89 of the planet carrier while maintaining the engagement of the sun gear teeth with the teeth 86 of the planet gears 84. Such engagement of the sun gear teeth 98 with both the planet carrier 76 and the planet gears 84 locks out any planetary operation of the first planetary gear set and thereby rotatively drives the planet carrier without any speed reduction from the input 28. In this locked or nonoperating position, the teeth 94 of the support portion 92 engage the sun gear teeth 98 to provide support of the planet carrier 76.

The second planetary gear set 70 as illustrated in FIG. 1 includes a pair of components embodied by an annular outer gear 106 having inwardly projecting teeth 107 and by a sun gear 108 having outwardly projecting teeth 109. Both of these gears 106 and 108 are supported for rotation about the central axis A. An input 112 of the second planetary gear set 70 is connected to the planet carrier 76 of the first planetary gear set 68 by a connector 114 which defines a shifting groove 116. Input 112 of the second planetary gear set 70 has a splined connection 118 to the annular outer gear 106 to provide rotational driving thereof from the first planetary gear set 68 in either low speed or high speed mode as previously described. Retaining rings 120 secure the splined connection 118 and provide axial shifting of the annular outer gear 106 during shifting of the second planetary gear set in a manner which is hereinafter described. Another component of the second planetary gear set 70 constitutes a planet carrier 122 which has a splined connection 124 to the central shaft 40 so as to rotate therewith about the central axis A. Thus, the planet carrier 122 constitutes a component of the second planetary gear set 70 connected to the first output 36 of the transfer case. Similarly, the sun gear 108 constitutes another component of the second planet gear set 70 and is connected to the second output 38 through the output member embodied by the chain sprocket 71, the chain 72, and the chain sproket 73 on the output shaft 58 of the second output 38.

Figure 2:
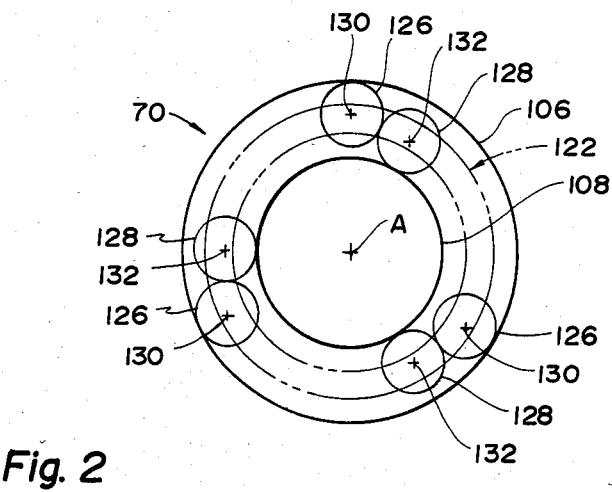
FIG. 2 is a partial schematic view taken along the direction of line 2—2 in FIG. 1 to illustrate first and second sets of planet gears of the second planetary gear set.

With combined reference to FIGS. 2 and 3, the planet carrier 122 of the second planetary gear set 70 has first and second sets of planet gears 126 and 128 supported by bearings 129 on associated shafts 130 and 132 for rotation about associated planet axes that extend parallel to the central axis A. The first set of planet gears 126 has teeth 134 meshed with the teeth 107 of the annular outer gear 106. The second set of planet gears 128 has teeth 136 meshed with both the teeth 134 of the first set of planet gears 126 and with the teeth 109 of the sun gear 108. Planet carrier 122 of the second planetary gear set 70 has spaced front and rear portions 138 and 140 between which the planet gear shafts extend to support the sets of planet gears 126 and 128. The rear planet carrier portion 140 has teeth 141 that engage the sun gear teeth 109 in a locked position of the second planetary gear wet 70 as described below. Between the circumferentially spaced planet gears, the planet carrier 122 also includes support portions 142 that project axially and inwardly and have teeth 144 for providing support of the planet carrier in the locked position of the second planetary gear set as is more fully hereinafter described. The second planetary gear set 70 has its operating position illustrated in FIG. 3 where planetary operation thereof about the central axis A provides a differential action as described below between the first and second outputs 36 and 38. In addition, the second planetary gear set 70 has its locked position illustrated in FIG. 1 where the planetary operation thereof is locked out to connect both outputs 36 and 38 without any differential action.

In the operating position of the second planetary gear set 70 as illustrated in FIG. 3, the teeth 109 of the sun gear 108 are meshed only with the second set of planet gears 128 which are also meshed with the first set of planet gears 126 whose meshing with the annular outer gear 106 provides a planetary operation. Rotational driving of the input 112 of the second planetary gear set 70 by the first planetary gear set 68 in the manner previously described thus rotatively drives both the first and second outputs 36 and 38 while the second planetary gear set provides a differential action between the outputs. Sun gear 108 and chain sprocket 71 are preferably made as a unitary component and are rotatively supported on the shaft 40 by a pair of bearings 145 to permit the differential action when necessary due to different speeds of the front and rear axles.

In the locked position of the second planetary gear set 70 illustrated in FIG. 1, the teeth 109 of the sun gear 108 are engaged with the teeth 136 of the second set of planet gears 128 and with the teeth 141 of the rear portion 140 of planet carrier 122. As such, planetary operation of the second planetary gear set 73 is locked out such that the driving of the input 112 thereof by the first planetary gear set provides rotational driving of both outputs 36 and 38 at the same speed without any differential action.

Use of two sets of planet gears 126 and 128 in the second planetary gear set 70 as described provides both outputs 36 and 38 with the same direction of rotation for driving the associated pairs of wheels. As such, there is no necessity to reverse the direction of driving of one output or the other which would be necessary if only one set of planet gears were used in a meshing relationship directly with both the sun and annular outer gear.

With reference to both FIGS. 1 and 3, a schematically indicated selector 146 of the transfer case is received within the shifting groove 116 of the connector 114 between the two planetary gear sets 68 and 70. Operation of the selector 146 selectively and alternately positions the first and second planetary gear sets 68 and 70 in the position of FIG. 1 or the position of FIG. 3. In the position of FIG. 1 as previously described, the first planetary gear set 68 is in its operating position and the second planetary gear set 70 is in its locked position to provide low speed driving without any differential action between the first and second outputs 36 and 38. In the position of FIG. 3 as previously described, the first planetary gear set 68 is in its locked or nonoperating position and the second planetary gear set 70 is in its operating position to provide high speed driving with differential action between first and second outputs 36 and 38.

It should be noted that both the first and second planetary gear sets 68 and 70 are located between the input 28 and the output member embodied by the chain sprocket 71 which is possible due to the construction of the second planetary gear set 70 having gears which all rotate about the central axis A or about axes parallel to the central axis. On the opposite side of the chain sprocket 71 from the planetary gear sets, the transfer case housing 12 includes a divider 148 having seals 150 and 152 with the central shaft 40. A worm gear 154 on the shaft 40 between the seal 152 and the antifriction bearing 44 permits a speedometer takeoff to be connected to read the driving speed of the vehicle. Also, shaft 40 has a central bore 156 and radial bores 158 communicated therewith to permit lubrication of the transfer case components.

While the best mode for carrying out the invention has been described in detail, those familiar with the art to which this invention relates will recognize various alternative designs and embodiments for practicing the present invention as defined by the following claims.

What is claimed is:

1. In a vehicle transfer case including an input adapted to be rotatively driven about a central axis by an engine and also including first and second outputs that are spaced from the input and respectively rotatively drive first and second pairs of wheels, the improvement comprising:

a first planetary gear set that is rotatively driven by the input and located between the input and both outputs;

a second planetary gear set that is rotatively driven by the first planetary gear set and located adjacent thereto between the input and both outputs;

said first planetary gear set having an operating position where the planetary operation thereof about the central axis by driving rotation of the input provides driving of the second planetary gear set with speed reduction, the first planetary gear set also having a nonoperating position where driving of the second planetary gear set by the input is provided without any speed reduction resulting from planetary operation of the first planetary gear set;

said second planetary gear set including a pair of components embodied by first and second gears supported for rotation about the central axis, said second planetary gear set also including another component embodied by a planet carrier rotatable about the central axis, two of said components being respectively connected to the first and second outputs and the other component being rotatively driven by the first planetary gear set, said planet carrier having first and second sets of planet gears supported thereby for rotation about associated planet axes that extend parallel to the central axis, said first and second sets of planet gears being respectively meshed with the first and second gears and also being meshed with each other to connect the first and second outputs, the second planetary gear set having an operating position where planetary operation thereof about the central axis provides a differential action between the first and second outputs, the second planetary gear set also having a locked position where the planetary operation thereof is locked out to connect both outputs without any differential action;

a central shaft that extends along the central axis through both the first and second planetary gear sets, said central shaft having one end that is located adjacent the input of the transfer case and another end that constitutes the first output of the transfer case;

an output member rotatably on the central shaft between the ends thereof and being connected to the second output of the transfer case; and a selector for selectively positioning: (a) the first planetary gear set in its operating position and the second planetary gear set in its locked position to provide low speed driving without any differential action between the first and second outputs, or (b) the first planetary gear set in its nonoperating position and the second planetary gear set in its operating position to provide high speed driving with differential action between the first and second outputs.

2. A transfer case as in claim 1 wherein the first planetary gear set includes an annular outer gear extending about the central axis, a planet carrier rotatable about the central axis and including planet gears supported thereby within the outer gear thereof and meshed with the outer gear, and a sun gear rotatable about the central axis within the outer gear thereof and meshed with the planet gears.

3. A transfer case as in claim 1 or 2 wherein the first gear of the second planetary gear set is embodied by an annular outer gear that extends about the central axis with one of the sets of planet gears meshed therewith, and the second gear of the second planetary gear set being embodied by a sun gear that is rotatable about the central axis within the outer gear thereof and meshed with the other set of planet gears.

4. A transfer case as in claim 3 wherein the first outer gear of the second planetary gear set is rotatively driven by the first planetary gear set.

5. A transfer case as in claim 1 wherein the first planetary gear set includes a sun gear rotatively driven by the input and also includes an annular outer gear and a planet carrier having planet gears meshed with both the sun gear and the annular outer gear, said outer gear being rotatable with respect to its associated planet carrier and movable therewith along the central axis, a stationary grounding plate that is engaged by the outer gear upon axial movement thereof with its associated planet carrier along the central axis to prevent rotation of the outer gear in the operating position of the first planetary gear set, and the sun gear being engaged with the planet carrier and with the planet gears of the first planetary gear set and the outer gear thereof being disengaged from the stationary plate upon axial movement of the outer gear and associated planet carrier to the locked position where the sun gear drives the planet carrier of the first planetary gear set without any speed reduction.

6. A transfer case as in claim 5 wherein the second planetary gear set includes an annular outer gear that constitutes the component thereof rotatively driven by the first planetary gear set and having a connection to the planet carrier of the first planetary gear set so as to be axially movable therewith along the central axis, the planet carrier of the second planetary gear set constituting the component thereof connectd to the first output, the second planetary gear set including a sun gear that constitutes the component thereof connected to the second output, the sun gear of the second planetary gear set being engaged with the planet carrier and planet gears thereof in the locked position of the second planetary gear set to prevent any differential action between the first and second outputs, and the sun gear of the second planetary gear set being disengaged from the planet carrier thereof by axial movement to the operating position to provide differential action between the first and second outputs.

7. A transfer case as in claims 1, 2, 5 or 6 wherein the planetary gear sets include an intermediate connector that defines a shifter groove, and the selector including a single shifter received by the shifter groove of said connector to provide axial shifting of both planetary gear sets between the operating and locked positions.

8. In a vehicle transfer case including an input adapted to be rotatively driven about a central axis by an engine and also including first and second outputs for respectively rotatively driving first and second pairs of wheels, the improvement comprising:

a central shaft rotatable about the central axis and having one end adjacent the engine driven input and another end that constitutes the first output, an output member mounted on the central shaft between the input and first output and connected to the second output;

a first planetary gear set rotatively driven by the input about the central shaft at a location between the input and the output member connected to the second output, the first planetary gear set thus being located between the input and both outputs;

a second planetary gear set rotatively driven by the first planetary gear set about the central shaft at a location adjacent thereto between the first planetary gear set and the output member connected to the second output, the second planetary gear set thus being located between the input and both outputs;

said first planetary gear set having an operating position where planetary operation thereof about the central axis by driving rotation of the input provides driving of the second planetary gear set with speed reduction, the first planetary gear set also having a nonoperating position where driving of the second planetary gear set by the input is provided without any speed reduction resulting from planetary operation of the first planetary gear set;

said second planetary gear set including a pair of components embodied by first and second gears supported for rotation about the central axis, said second planetary gear set also including another component embodied by a planet carrier rotatable about the central axis, two of said components being respectively connected to the first output end of the central shaft and to the output member connected to the second output, the other component being rotatively driven by the first planetary gear set, said planet carrier having first and second sets of planet gears supported thereby for rotation about associated planet axes that extend parallel to the central axis, said first and second sets of planet gears being respectively meshed with the first and second gears and also being meshed with each other to connect the first and second outputs, the second planetary gear set having an operating position where planetary operation thereof about the central axis provides a differential action between the first and second outputs, the second planetary gear set also having a locked position where the planetary operation thereof is locked out to connect both outputs without any differential action; and a selector for selectively positioning: (a) the first planetary gear set in its operating position and the second planetary gear set in its locked position to provide low speed driving without any differential action between the first and second outputs, or (b) the first planetary gear set in its nonoperating position and the second planetary gear set in its operating position to provide high speed driving with differential action between the first and second outputs.

9. In a vehicle transfer case including an input adapted to be rotatively driven about a central axis by an engine and also including first and second outputs for respectively rotatively driving first and second pairs of wheels, the improvement comprising:

a central shaft rotatable about the central axis and having one end adjacent the engine driven input and another end that constitutes the first output, an output member mounted on the central shaft between the input and first output and connected to the second output;

a first planetary gear set rotatively driven by the input about the central shaft at a location between the input and the output member connected to the second output, the first planetary gear set thus being located between the input and both outputs;

a second planetary gear set rotatively driven by the first planetary gear set about the central shaft at a location adjacent thereto between the first planetary gear set and the output member connected to the second output, the second planetary gear set thus being located between the input and both outputs;

said first planetary gear set including a sun gear rotatively driven by the input and also including a component embodied by a planet carrier having planet gears meshed with the sun gear, the first planetary gear set further including another component embodied by an annular outer gear meshed with the planet gears, the first planetary gear set having an operating position where planetary operation thereof about the central axis by driving rotation of the input provides driving of the second planetary gear set through one of said components with speed reduction, the first planetary gear set also having a nonoperating position where driving of the second planetary gear set through one of said components by the input is provided without any speed reduction resulting from planetary operation of the first planetary gear set;

said second planetary gear set including a pair of components embodied by first and second gears supported for rotation about the central axis, said second planetary gear set also including another component embodied by a planet carrier rotatable about the central axis, two of said components of the second planetary gear set being respectively connected to the first output end of the central shaft and to the output member connected to the second output, the other component of the second planetary gear set being rotatively driven by the first planetary gear set, said planet carrier of the second planetary gear set having first and second sets of planet gears supported thereby for rotation about associated planet axes that extend parallel to the central axis, said first and second sets of planet gears being respectively meshed with the first and second gears and also being meshed with each other to connect the first and second outputs, the second planetary gear set having an operating position where planetary operation thereof about the central axis provides a differential action between the first and second outputs, the second planetary gear set also having a locked position where the planetary operation thereof is locked out to connect both outputs without any differential action; and an axially movable selector for selectively positioning: (a) the first planetary gear set in its operating position and the second planetary gear set in its locked position to provide low speed driving without any differential action between the first and second outputs, or (b) the first planetary gear set in its nonoperating position and the second planetary gear set in its operating position to provide high speed driving with differential action between the first and second outputs.

* * * * *